(12) United States Patent
Roth et al.

(10) Patent No.: US 10,392,187 B2
(45) Date of Patent: Aug. 27, 2019

(54) COUPLER WITH QUICK RELEASE HANDLE AND VALVE ASSEMBLIES

(71) Applicant: OPW-Engineered Systems, Inc., Lebanon, OH (US)

(72) Inventors: Joseph P. Roth, Milford, OH (US); David Morrow, Cincinnati, OH (US); Krzysztof Wejdman, Zielonki (PL); Stephen Hudson, Mirandah (AU); Shiang Taing, Chester Hill (AU)

(73) Assignee: OPW-ENGINEERED SYSTEMS, INC., Lebanon, OH (US)

( * ) Notice: Subject to any disclaimer, the term of this patent is extended or adjusted under 35 U.S.C. 154(b) by 64 days.

(21) Appl. No.: 15/599,334

(22) Filed: May 18, 2017

(65) Prior Publication Data

US 2017/0334640 A1 Nov. 23, 2017

Related U.S. Application Data

(60) Provisional application No. 62/339,338, filed on May 20, 2016.

(51) Int. Cl.
*B65D 90/66* (2006.01)
*F16L 37/40* (2006.01)
(Continued)

(52) U.S. Cl.
CPC ............. *B65D 90/66* (2013.01); *F16K 31/52* (2013.01); *F16K 31/602* (2013.01); *F16L 37/20* (2013.01); *F16L 37/40* (2013.01)

(58) Field of Classification Search
CPC .. Y10T 137/87973; B65D 90/66; F16L 37/40; F16L 37/20; F16K 31/602; F16K 31/52; F16K 31/60; F16K 31/52408
See application file for complete search history.

(56) References Cited

U.S. PATENT DOCUMENTS 3,664,634 A 5/1972 Guertin et al.
3,897,091 A 7/1975 McMath et al.
(Continued)

FOREIGN PATENT DOCUMENTS

WO WO 9804866 A1 * 2/1998 .......... F16L 37/1215

OTHER PUBLICATIONS

International Search Report for application No. PCT/US2017/033555 dated Aug. 7, 2017.

*Primary Examiner* — Marina A Tietjen
(74) *Attorney, Agent, or Firm* — Workman Nydegger

(57) ABSTRACT

A fluid coupling includes a body, a poppet valve assembly, a handle shaft assembly, and a retention member. The body has a fluid conduit, a through-hole extending through a sidewall, and one or more openings that extend between an external surface of the body and an interior of the through hole. The poppet valve assembly is disposed within the fluid conduit and is selectively movable between an open position and a closed position. The handle shaft assembly extends through the through-hole and into the fluid conduit and is interconnected with the poppet valve assembly such that the handle shaft assembly can be actuated to move the poppet valve assembly between the open position and the closed position. The retention member is insertable through the one or more openings and into the through-hole to interact with the handle shaft assembly to selectively hold the handle shaft assembly in the body.

20 Claims, 9 Drawing Sheets

(51) Int. Cl.
*F16L 37/20* (2006.01)
*F16K 31/60* (2006.01)
*F16K 31/52* (2006.01)

(56) References Cited

U.S. PATENT DOCUMENTS

| | | | |
|---|---|---|---|
| 6,672,327 B1 * | 1/2004 | Krywitsky | F16K 27/07 137/614.06 |
| 8,302,628 B2 | 11/2012 | Tausch et al. | |
| 2008/0128034 A1 | 6/2008 | Fahl | |
| 2010/0096579 A1 | 4/2010 | Tausch et al. | |

* cited by examiner

COUPLER WITH QUICK RELEASE HANDLE AND VALVE ASSEMBLIES

This application claims priority to and the benefit of U.S. Provisional Application No. 62/339,338, filed May 20, 2016, and entitled COUPLER WITH QUICK RELEASE HANDLE AND VALVE ASSEMBLIES, the entire content of which is incorporated herein by reference.

BACKGROUND

1. Technical Field

Exemplary embodiments of the present disclosure relate to fluid system components. More particularly, exemplary embodiments of the present disclosure relate to couplers that can be quickly disassembled and reassembled for servicing.

2. The Relevant Technology

Transferring liquid product from large volume storage tanks into tank trucks or rail cars involves moving the liquid product through a fixed pipeline riser to storage containers of various sizes and orientations located in or on the tank trucks or rail cars. The various configurations of tank trucks and rail cars may require a flexible fluid transfer system such as a loading arm assembly. The loading arm assembly is a section of pipeline capable of handling high flows and line pressures that can be moved both vertically and horizontally to accommodate transport vehicles of various configurations.

One particular method of transferring liquid product through the loading arm involves using a bottom loading coupler to couple the loading arm to the storage container of the transport vehicle. The bottom loading coupler attaches to a corresponding adapter located on the vehicle storage container. A poppet valve assembly located in the body of the bottom loading coupler may be used to control the flow of liquid into the storage container. The poppet valve assembly may be actuated using a handle positioned on the outside of the body of the bottom loading coupler. The handle is generally coupled to the poppet valve assembly via a shaft which extends through a bushing positioned in a hole extending through the body of the bottom loading coupler.

The various components of the bottom loading coupler, and particularly the seals, may be prone to wear. As the components wear, the bottom loading coupler may not function properly, thus presenting a risk of uncontrolled release of product from the bottom loading coupler. To alleviate such risks, the bottom loading coupler may be removed from service at the first signs of component wear or at predetermined intervals to replace or repair the worn components. To repair or replace the worn components, the bottom loading coupler is disassembled to provide access to the worn components. With the bottom loading coupler disassembled, the worn components can be repaired or replaced and the bottom loading coupler can be reassembled and returned to service. Such a process of disassembling and reassembling a bottom loading coupler can take up to several hours, which can lead to significant downtime and the drawbacks associated therewith.

Accordingly, a need exists for alternative designs for bottom loading couplers that can be disassembled and reassembled quickly.

BRIEF SUMMARY

Exemplary embodiments of the present disclosure relate to coupling devices that can be quickly disassembled and reassembled to allow for repair or replacement of worn components in a timely manner. For example, in one embodiment, a fluid coupling includes a body, a poppet valve assembly, a handle shaft assembly, and a retention member. The body has a fluid conduit, a through-hole extending through a sidewall, and one or more openings that extend between an external surface of the body and an interior of the through hole. The poppet valve assembly is disposed within the fluid conduit and is selectively movable between an open position and a closed position. The handle shaft assembly extends through the through-hole and into the fluid conduit and is interconnected with the poppet valve assembly such that the handle shaft assembly can be actuated to move the poppet valve assembly between the open position and the closed position. The retention member is insertable through the one or more openings and into the through-hole to interact with the handle shaft assembly to selectively hold the handle shaft assembly in the body.

These and other objects and features of the present disclosure will become more fully apparent from the following description and appended claims, or may be learned by the practice of the disclosed embodiments as set forth hereinafter.

BRIEF DESCRIPTION OF THE DRAWINGS

To further clarify the above and other advantages and features of the present disclosure, a more particular description will be rendered by reference to specific embodiments thereof which are illustrated in the appended drawings. It is appreciated that these drawings depict only typical embodiments and are therefore not to be considered limiting of its scope, nor are the drawings necessarily drawn to scale. The disclosure will be described and explained with additional specificity and detail through the use of the accompanying drawings in which.

DETAILED DESCRIPTION

The present disclosure relates to coupling devices that can be quickly disassembled and reassembled to allow for repair or replacement of worn components in a timely manner. For example, in one embodiment, a fluid coupling includes a body, a poppet valve assembly, a handle shaft assembly, and a retention member. The body has a fluid conduit, a through-hole extending through a sidewall, and one or more openings that extend between an external surface of the body and an interior of the through hole. The poppet valve assembly is disposed within the fluid conduit and is selectively movable between an open position and a closed position. The handle shaft assembly extends through the through-hole and into the fluid conduit and is interconnected with the poppet valve assembly such that the handle shaft assembly can be actuated to move the poppet valve assembly between the open position and the closed position. The retention member is insertable through the one or more openings and into the through-hole to interact with the handle shaft assembly to selectively hold the handle shaft assembly in the body.

Reference will now be made to the drawings to describe various aspects of exemplary embodiments of the disclosure. It is understood that the drawings are diagrammatic and schematic representations of such exemplary embodiments, and are not limiting of the present disclosure. While the drawings are not necessarily drawn to scale, the drawings may be to scale for some embodiments. No inference should therefore be drawn from the drawings as to the dimensions of any embodiment or element, unless indicated otherwise. In the following description, numerous specific details are set forth in order to provide a thorough understanding of the present disclosure. It will be obvious, however, to one of ordinary skill in the art that the present disclosure may be practiced without these specific details.

FIGS. 1-4 illustrate various perspective, cross-sectional, and exploded views of one embodiment of a bottom loading coupler 100. The bottom loading coupler 100 generally comprises a coupler body 101 having a poppet valve assembly 111 disposed within a cylindrical cavity formed by the body 101. An outer coupler sleeve 117 is disposed around the body 101 and is configured to assist with connecting the bottom loading coupler 100 to a bottom loading adapter (not shown). The body 101 and the coupler sleeve 117 may be made of a metallic material, such as cast anodized aluminum, for example. Other materials for the body 101 and coupler sleeve 117 may also be utilized.

Figure 3:
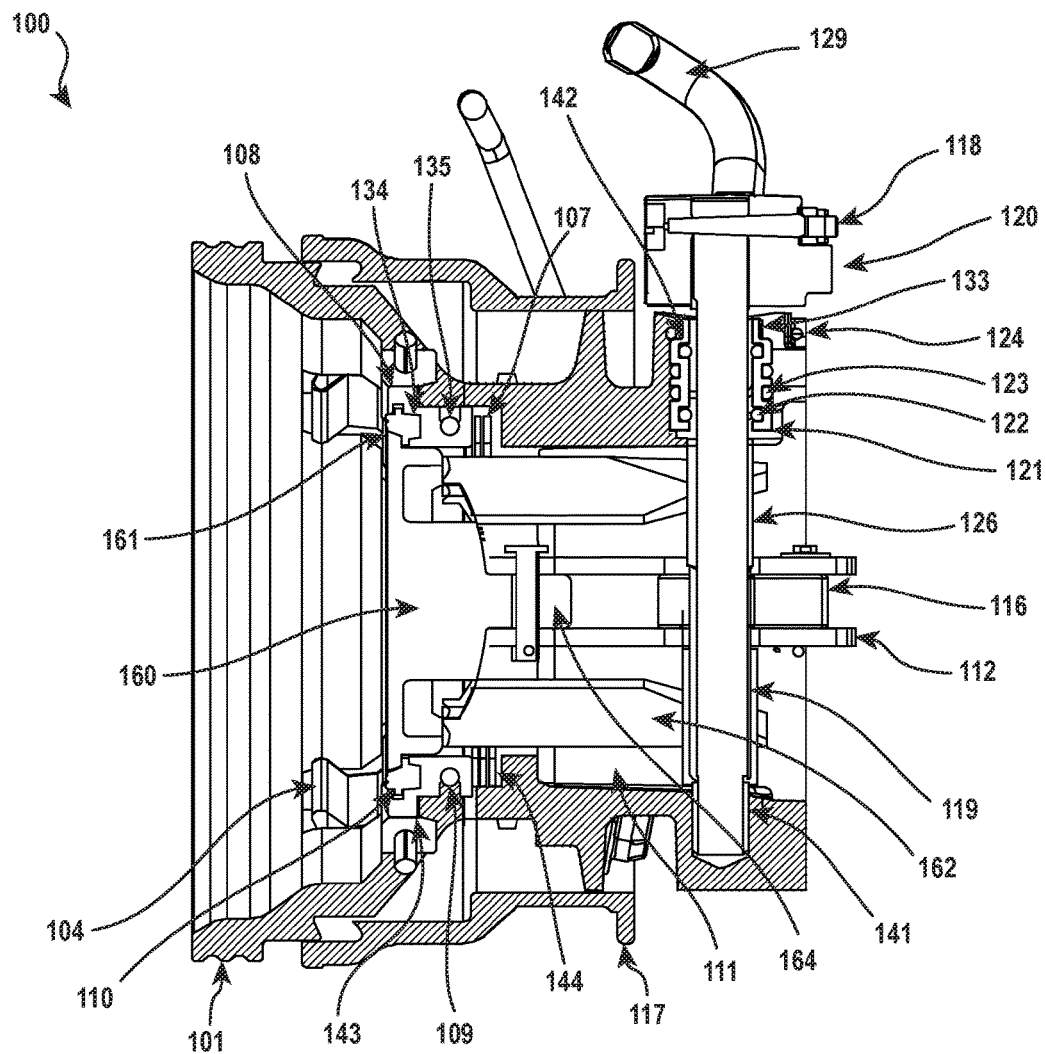
FIG. 3 is a cross-sectional view of the coupling device of FIG. 1.

The body 101 defines an inner cylindrical cavity or fluid conduit 140 in which the poppet valve assembly 111 and a handle shaft assembly 120 may be positioned. As illustrated in FIG. 3, two circumferential seats 143, 144 may be provided within an inner portion of the body 101 that are configured to provide a resting and sealing surface for the poppet valve assembly 111. When the bottom loading coupler 100 is in a closed position, the poppet valve assembly 111 may prevent a flow of liquid through the bottom loading coupler 100.

The coupler sleeve 117 may be moved in a direction away from the poppet valve assembly 111 when the bottom loading coupler 100 is engaged with a liquid storage or transport container (e.g., via a bottom loading adapter (not shown)). In some embodiments, sliding the coupler sleeve 117 in a direction toward the poppet valve assembly 111 allows for the operational handle 129 to be rotated in a direction that opens the poppet valve assembly 111 and places the bottom loading coupler in an open position. The bottom loading coupling may include a locking mechanism that selectively prevents the bottom loading coupler 100 from assuming an open position when the coupler is not engaged with a liquid storage or transport container (or other similar device) by not allowing the coupler sleeve 117 to slide into an open position, which also prevents the rotation of the operational handle 129.

As illustrated in FIG. 3, the body 101 may also comprise a blind bore 141 within an inner surface of the body 101. The body 101 may further comprise a through-hole 142 that is opposite from the blind bore 141. The blind bore 141 and through-hole 142 may be formed in the body 101 during a casting operation or machined during a machining operation. As described in more detail below, the blind bore 141 and through-hole 142 may be configured to receive and maintain the handle shaft assembly 120. The body 101 may also comprise a plurality of coupling holes 145 to couple the bottom loading coupler 100 to a fuel loading arm by fasteners such as nuts and bolts, for example.

In one or more embodiments, the poppet valve assembly 111 may comprise a poppet 160, a nose seal 110, an adapter ring 108, a cylinder O-ring 109, and a wave spring 107. Poppet valve assemblies of other embodiments may have more or fewer components than those illustrated. In the illustrated embodiment, the poppet 160 comprises face having a rim or edge 161 that is configured to engage the nose seal 110. The adapter ring 108 comprises an inner circumferential seat 134 in which the nose seal 110 may be seated. The cylinder O-ring 109 may be positioned around the adapter ring 108 within a circumferential groove 135. The wave spring 107 may be positioned between the adapter ring 108 and circumferential seat 144 of the body 101, as shown in FIG. 3. A flange of the adapter ring 108 may be seated within the circumferential seat 143, as also shown in FIG. 3.

Figure 1:
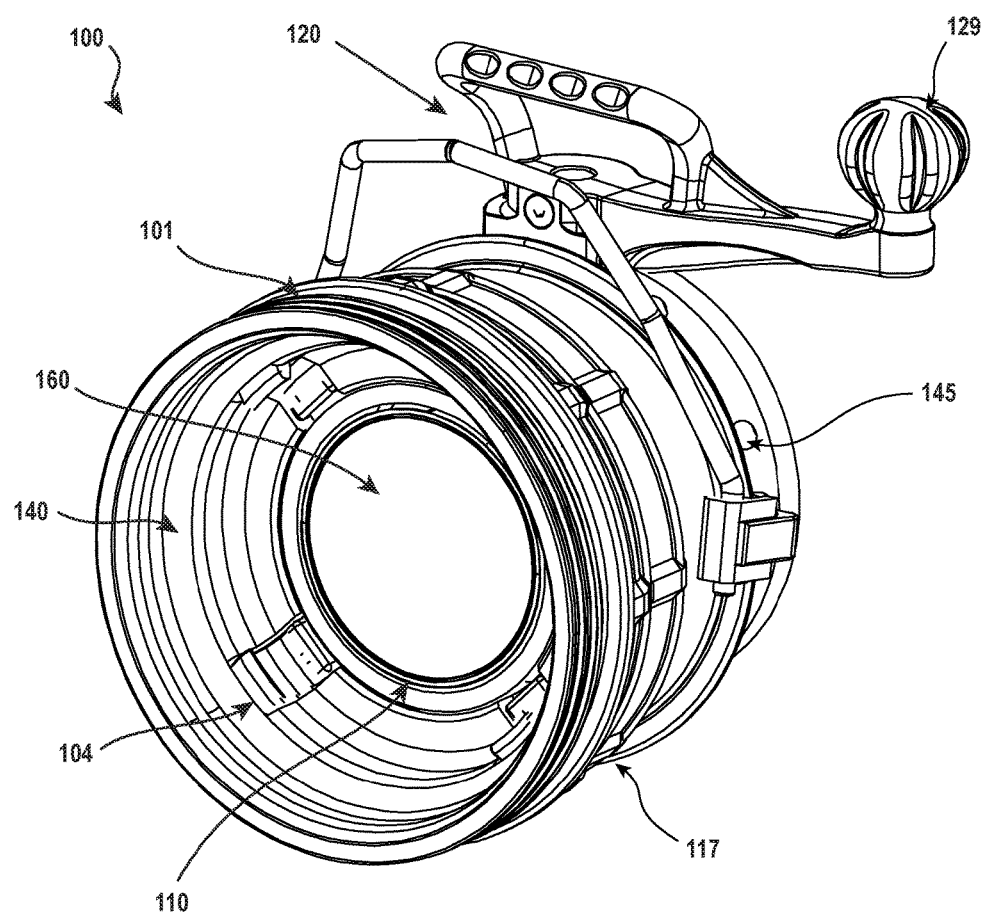
FIG. 1 is a front perspective view of a coupling device according to one example embodiment of the present disclosure.
Figure 2:
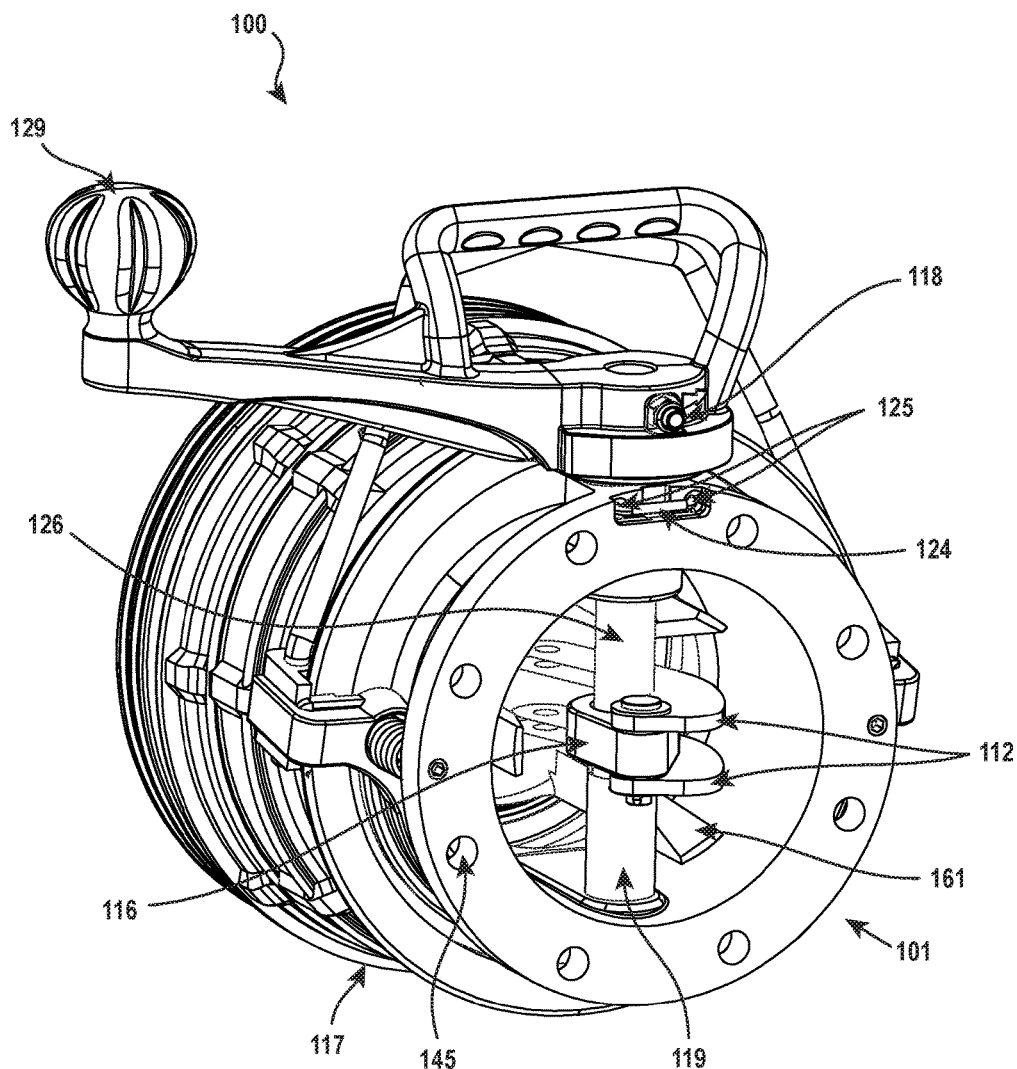
FIG. 2 is a rear perspective view of the coupling device of FIG. 1.
Figure 4:
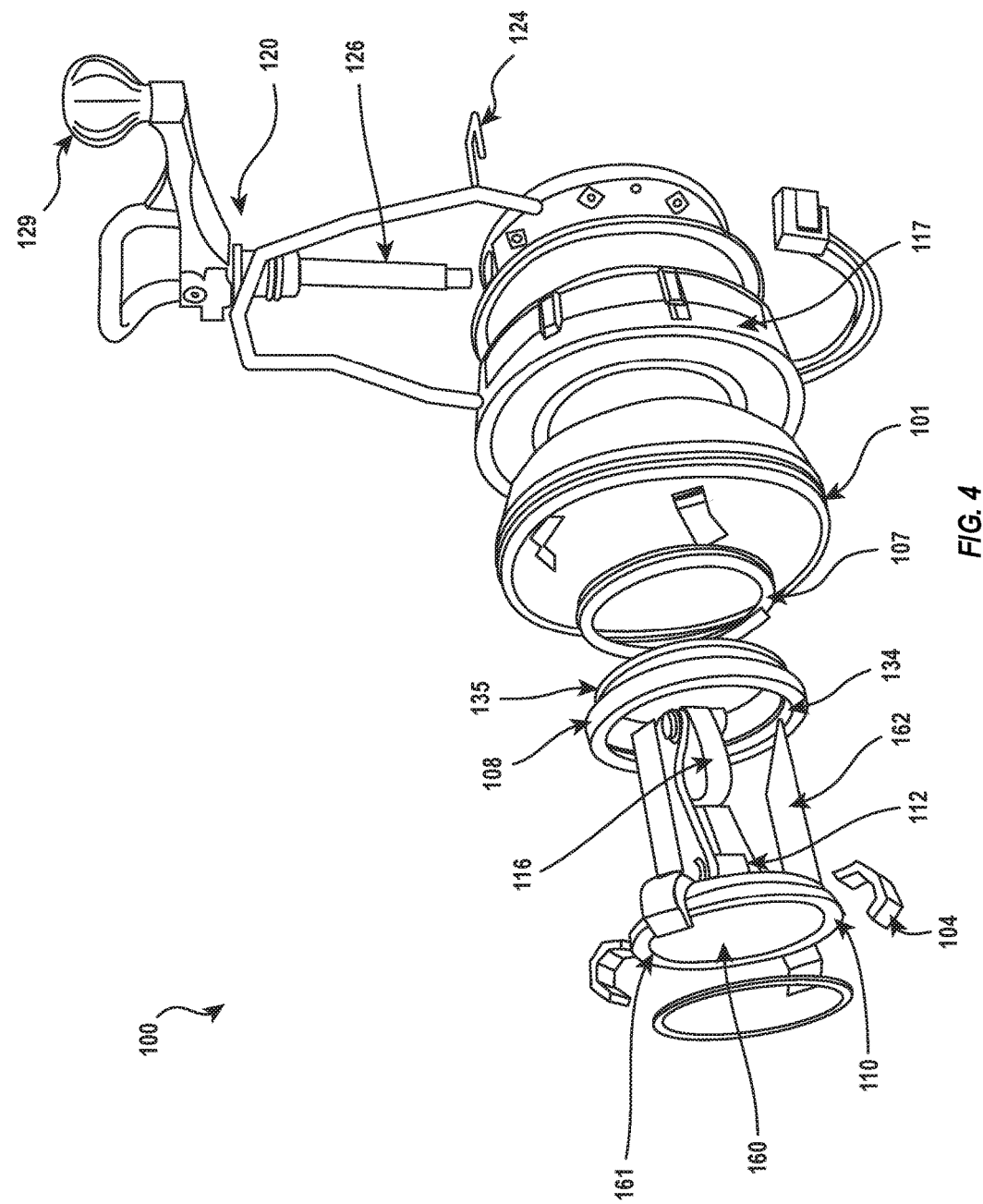
FIG. 4 is an exploded view of the coupling device of FIG. 1.

As illustrated in FIGS. 3 and 4, the poppet 160 may comprises a plurality of legs 162 that extend from the face. When assembled, the legs 162 are positioned in the cylindrical cavity 140 of the body 101 and may contact an inner bore of the adapter ring 108 to provide guidance to the poppet 160. The poppet 160 may also have a coupling plate 164 to facilitate connection between the poppet valve assembly 111 and the handle shaft assembly 120. More specifically, interconnected between the poppet 160 and the handle shaft assembly 120 is a linkage assembly that includes a drive linkage 116 and one or more links 112. As best seen in FIG. 3, one end of the links 112 are connected to the coupling plate 164 of the poppet 160 while the other ends of the links are connected to the drive linkage 116. The drive linkage 116 is in turn connected to the handle shaft assembly 120, as shown in FIGS. 2 and 3.

The handle shaft assembly 120 includes a tube spacer 119, a handle shaft 126, a stuff box 121, at least one internal sealing member 122, at least one external sealing member 123, and an operational handle 129. The tube spacer 119 generally comprises a hollow cylindrical shaft configured to accept the handle shaft 126. The handle shaft 126 generally comprises a solid shaft. A first end of the handle shaft 126 (opposite the operational handle 129) is configured/sized for insertion into the blind bore 141. A second end of the handle shaft 126 is configured to have the operational handle 129 connected thereto.

The linkage assembly, and particularly the drive linkage 116 thereof, may be mounted on the handle shaft 116 between the first and second ends thereof. The handle shaft 126 and the drive linkage 116 may have corresponding interfacing surface features (e.g., flat surfaces, star shapes, etc.) that prevent rotation of the handle shaft 126 with respect to the drive linkage 116 when the handle shaft 126 is inserted in the drive linkage 116. Such interfacing surface features may eliminate the need for a pin or a screw or other fastener to maintain the rotational linkage between handle shaft 126 and the drive linkage 116. Other geometric configurations that prevent the rotation of the handle shaft 126 with respect to the drive linkage 116 may also be utilized.

FIG. 3 depicts one embodiment of a stuff box 121 shown in axial cross section. The stuff box 121 may be substantially circular in radial cross section and have a bore extending therethrough through which the handle shaft 126 can extend. An exterior surface of the stuff box 121 may include one or more annular grooves for receiving one or more external sealing members 123. The sealing members 123 may create a seal between the stuff box 121 and the through-hole 142. An interior surface of the stuff box 121 may also have one or more annular grooves for receiving one or more internal sealing members 122. The sealing members 122 may create a seal between the stuff box 121 and the handle shaft 126.

The operational handle 129 may be connected to the handle shaft 126 with one or more fasteners 118. As can be seen in FIGS. 2 and 3, a bolt can extend through the operational handle 129 and the handle shaft 126. A nut can secure the bolt in place, thereby securing the operational handle 129 to the handle shaft 126. As discussed below, the operational handle 129 can be removed from the handle shaft 126 to allow for the stuff box 121 to be removed from the handle shaft 126. With the stuff box 121 removed from the handle shaft 126, the stuff box 121, including the seals 122, 123, or just the seals 122, 123 may be serviced or replaced.

The handle shaft assembly 120 may be selectively secured within the body 101 by a retention member 124, such as a U-pin. The retention member 124 may be inserted into the body 101 through one or more openings 125, as shown in FIG. 2. When inserted through the openings 125, the retention member 124 can interact with the handle shaft assembly 120 to prevent the handle shaft assembly 120 from being withdrawn out of the body 101 through the through-hole 142.

In the illustrated embodiment, the one or more openings 125 open into the through-hole 142. In some embodiments, the one or more openings 125 are oriented generally parallel to the inner cylindrical cavity 140 and generally perpendicular to the through-hole 142. According to the illustrated embodiment, the one or more openings 125 are positioned in the body 101 such that the retention member 124 is positioned adjacent to an end of the stuff box 121 and between the stuff box 121 and an external opening to the through-hole 142. As illustrated in FIG. 3, some embodiments of stuff box 121 include a shoulder 133 with which the retention member 124 interacts.

In the illustrated embodiment, the retention member 124 takes the form of a U-pin that has two legs. The legs may be inserted into the two openings 125. The two openings 125 are positioned and spaced apart such that the legs of the U-pin are positioned on opposing sides of the handle shaft 126 when the U-pin is inserted into the openings 125. The legs of the U-pin are spaced apart sufficiently to allow the handle shaft 126 to rotated therebetween.

The stuff box 121 (or the shoulder 133 thereof) may have an outer dimension that is larger than the spacing between the legs of the U-pin. Because of the spacing of the U-pin legs and the position of the U-pin between the stuff box 121 and the external opening of the through-hole 142, the U-pin prevents the handle shaft assembly 120 from being inadvertently removed from the body 101.

It will be appreciated that the retention member 124 may be positioned in other location to selectively hold the handle shaft assembly 120 in the body 101. For instance, rather than opening into the through-hole 142, the openings 125 may open into the blind bore 141. When the retention member 124 is inserted into the openings 125, the retention member 124 may interact with the portion of the handle shaft 126 that is inserted into the blind bore 141. For example, the handle shaft 126 may include an annular groove into which the retention member 124 (or legs thereof) may be inserted. The annular groove may allow for the handle shaft 126 to rotate relative to the retention member 124, but the retention member 124 may interact with a wall of the annular groove to prevent the handle shaft assembly 120 from being inadvertently withdrawn from the body 101.

In the event that the bottom loading coupler 100 needs to be disassembled, such as to replace the seals 109, 110, the U-pin can be removed from the openings 125 to allow the handle shaft assembly 120 to be removed from the body 101. Once the handle shaft assembly 120 is removed, the poppet valve assembly 111 and related components, including the sales 109, 110, can be removed from the body 101.

Figure 5:
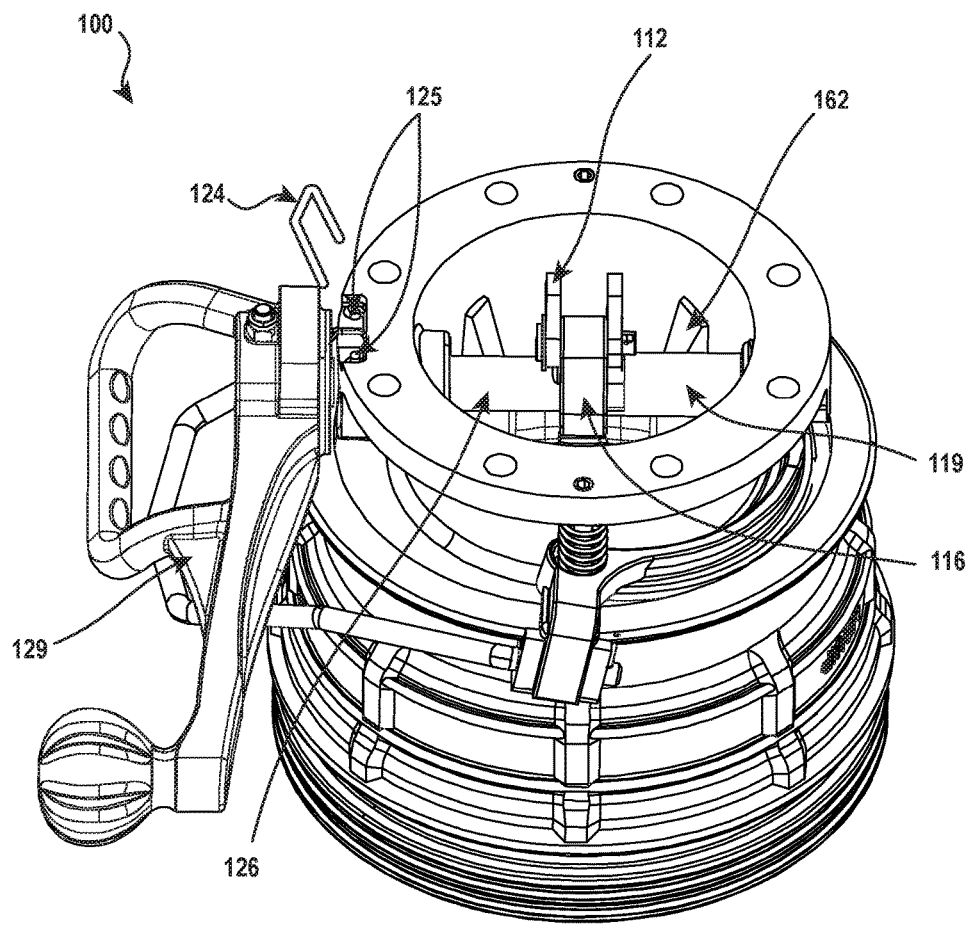
FIGS. 5-9 illustrate example steps performed in disassembling the coupling device of FIG. 1.
Figure 6:
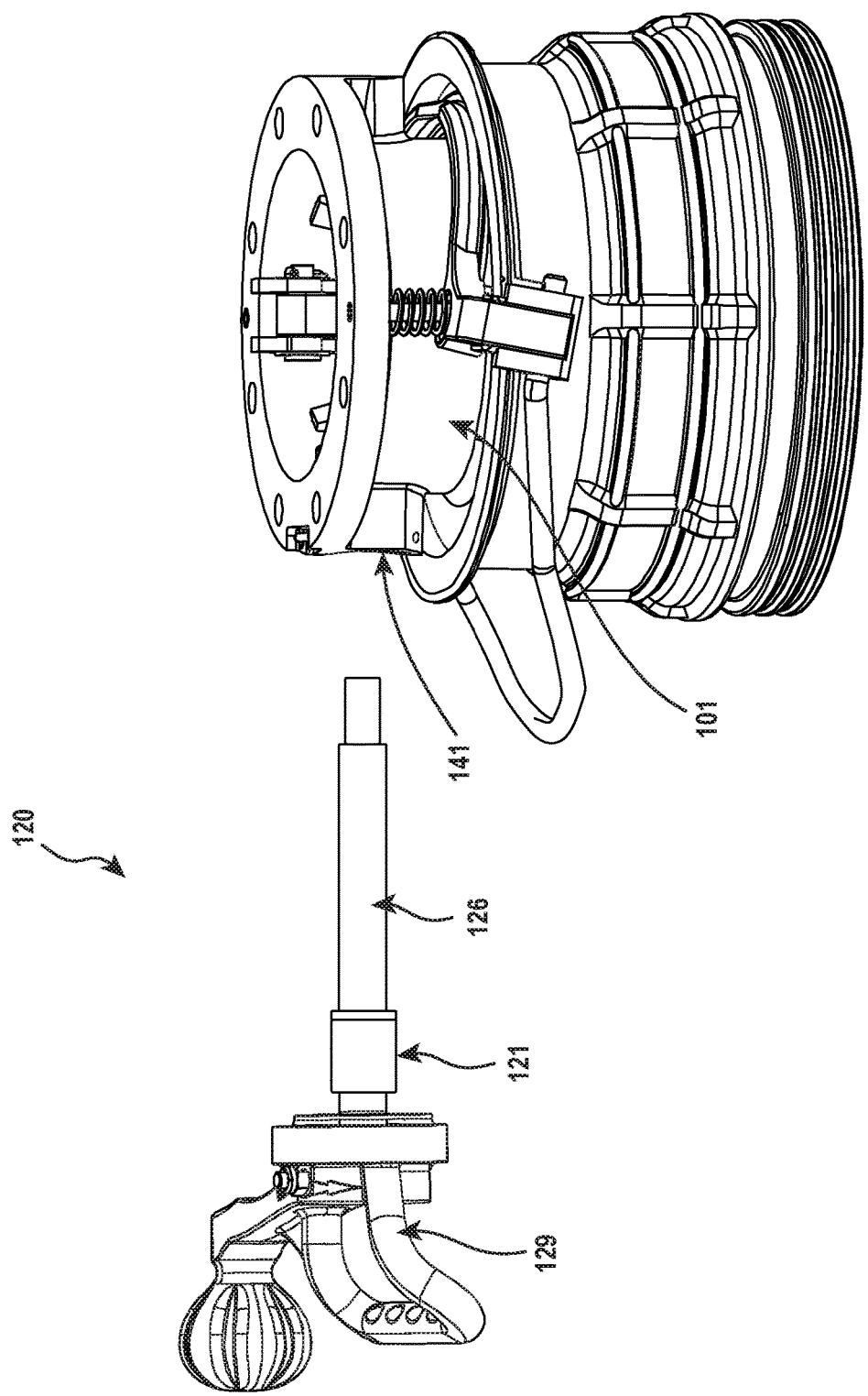

An example process for disassembling the bottom loading coupler 100 is illustrated in FIGS. 5-9. As illustrated in FIG. 5, the retention member 124 is initially removed from the openings 125. With retention member 124 removed, the handle shaft assembly 120 is not held in the body 101 by the retention member 124 and is held in place in the body 101 merely by friction. As a result, the handle shaft assembly 120 can be removed from the body 101 by pulling on the operational handle 129, as shown in FIG. 6. When the handle shaft assembly 120 is removed from the body 101, the end of the handle shaft 126 opposite the operational handle 129 is withdrawn from the blind bore 141. The handle shaft 126 is also withdrawn from the drive link 116 and the through-hole 142. The stuff box 121 is also removed from the through-hole 142.

Figure 7:
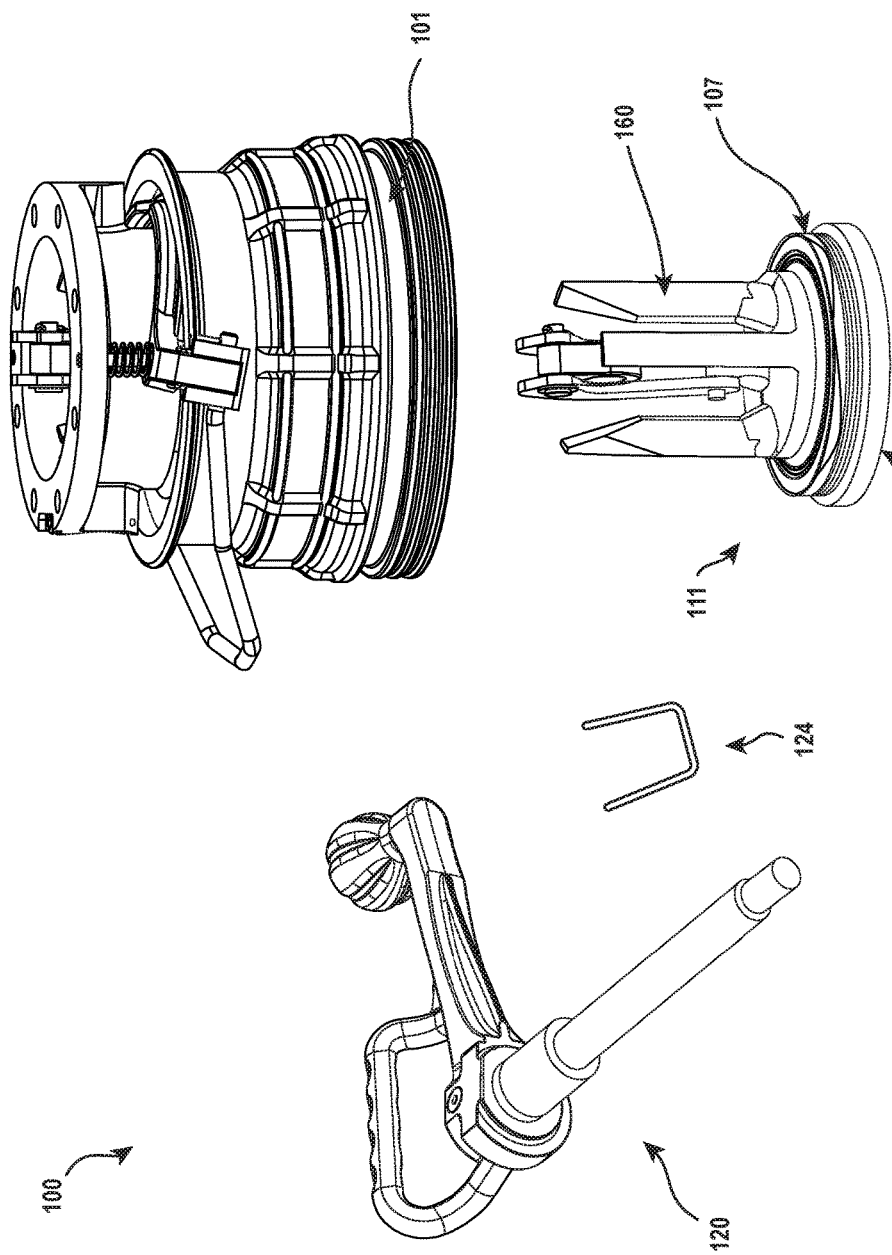

Once the handle shaft assembly 120 is removed from the body 101, the poppet valve assembly 111 is no longer interconnected with the body 101. Accordingly, as can be seen in FIG. 7, the body 101 can be lifted off of the poppet valve assembly 111. Alternatively, the poppet valve assembly 111 can be removed from the body 101.

Figure 8:
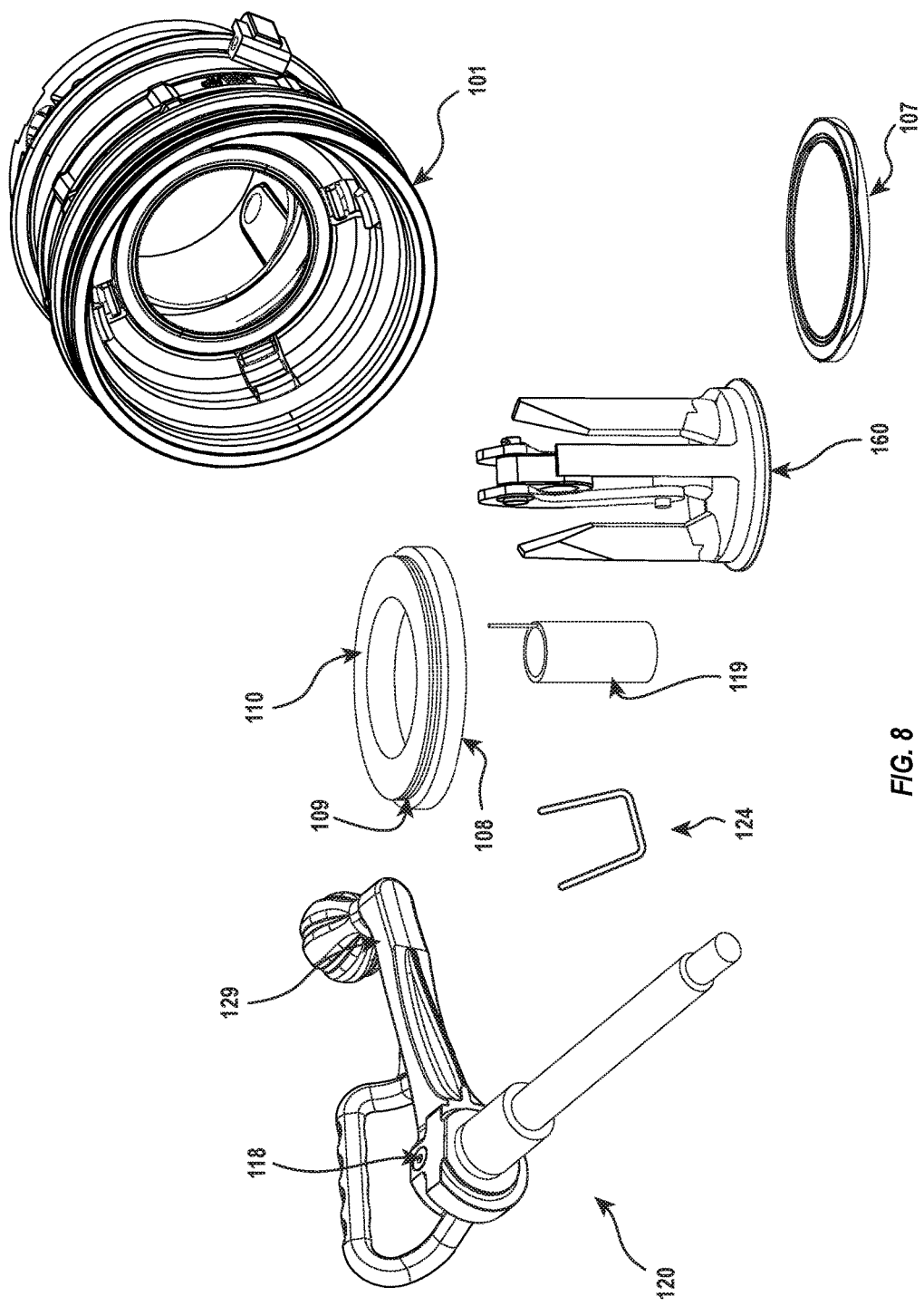

The components of the poppet valve assembly 111 can then be separated from one another as shown in FIG. 8. The various components can then be serviced or replaced as necessary. For instance, the seals 109, 110 may be removed from the adaptor ring 108 and replaced with new seals. Similarly, if needed, the wave spring 107 or poppet 160 can be replaced.

Figure 9:
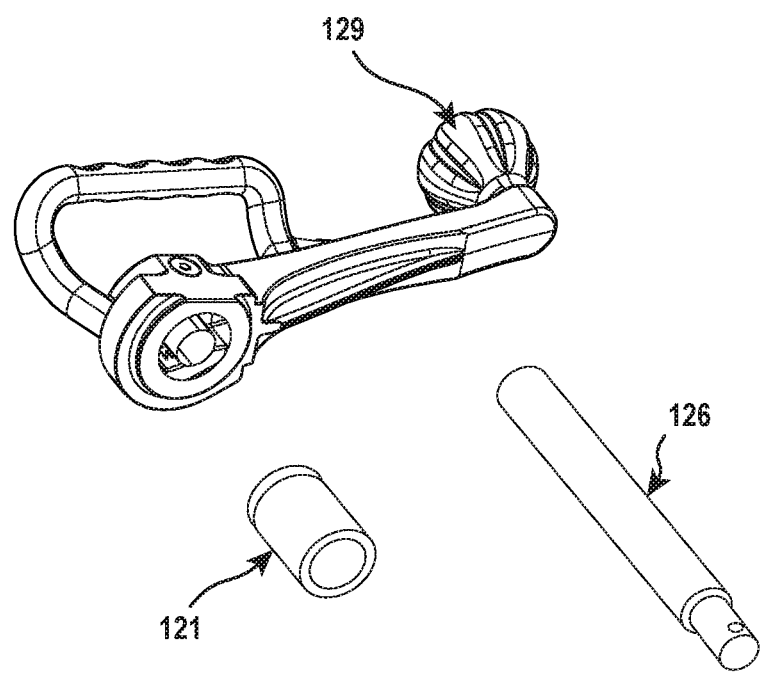

The stuff box 121 or its seals 122, 123 may also be replaced while the handle shaft assembly 120 is removed from the body 101. For instance, the fastener 118 may be removed from the handle 129, thereby disconnecting the handle 129 from the handle shaft 126. With the handle 129 removed from that handle shaft 126, the stuff box 121 can be removed from the handle shaft 126. As shown in FIG. 9, the staff box 121 can be removed from the handle shaft 126 by sliding the stuff box off of the end of the handle shaft 126 to which the handle 129 is normally connected. With this stuff box 121 removed from the handle shaft 126, the seals 122, 123 can be replaced. Alternatively, the stuff box 121 can be replaced with a new stuff box 121 with new seals 122, 123.

To reassemble the bottom loading coupler 100, the reverse process can be followed. In particular, the stuff box 121 is mounted on the handle shaft 126. The handle 129 is then secured to the end of the handle shaft 126 using the fastener 118. The adaptor ring 108 and wave spring 107 are then positioned around the poppet 160 as shown in FIG. 7. The poppet valve assembly 111 is then positioned within the body 101. The handle shaft assembly 120 is then inserted into the body 101. More specifically, the end of the handle shaft 126 opposite to the handle 129 is inserted through the through-hole 142, the drive link 116, the spacer 119, and in two the blind bore 141. Inserting the handle shaft 126 in this manner causes the stuff box 121 to be seated in the through-hole 142. At this point, the retention member 124 can be inserted into the openings 125 to secure the handle shaft assembly 120 within the body 101.

The operation of the bottom loading coupler 100 will now be described. The bottom loading coupler 100 is attached to a loading arm (not shown) via the coupling holes 145 of the body 101. Fasteners such as nuts and bolts may be utilized to attach the bottom loading coupler 100 to the loading arm. Next, a bottom loading adapter (not shown) that is connected to a liquid storage tank or other device is engaged with the cylindrical cavity 140 of the bottom loading coupler 100, which defeats the interlocks 104 and enables the coupler sleeve 117 to be slid toward the bottom loading adapter.

The operational handle 129 may be used to actuate the poppet valve assembly 111 of the bottom loading coupler 100. More specifically, the operational handle 129 may be rotated. The rotational motion of the operational handle 129 is imparted to the handle shaft 126 and communicated to the drive linkage 116, thereby rotating the drive linkage 116. When the handle shaft 126 and drive linkage 116 are rotated in a first direction, motion of the drive linkage 116 pushes the poppet valve assembly 111 open such that the rim or edge 161 of the poppet 160 is no longer in contact with the nose seal 110 seated within the adapter ring 108. When the handle shaft 126 and drive linkage 116 are rotated in a second, opposite direction, the motion of the drive linkage 116 pulls the poppet valve assembly closed such that the rim or edge 161 of the poppet 160 contacts the nose seal 110, thereby preventing the flow of liquid.

As the handle shaft 126 is rotated in the stuff box 121, the internal sealing members 122 maintain a seal between the handle shaft 126 and the stuff box 121. Similarly the external sealing members 123 seal the stuff box 121 to the body 101. Accordingly, liquid and/or gases flowing through the bottom loading coupler 100 cannot escape through or around the handle shaft assembly 120.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid coupling, comprising:
   a body having a fluid conduit extending therethrough, the body comprising a through-hole in a side wall thereof and one or more openings through an end wall thereof;
   a poppet valve assembly disposed within the fluid conduit, the poppet valve assembly being selectively movable between an open position and a closed position;
   a handle shaft assembly interconnected with the poppet valve assembly, the handle shaft assembly being actuatable to move the poppet valve assembly between the open position and the closed position, a portion of the handle shaft assembly extending through the through-hole; and
   a retention member that is selectively insertable into the body through the one or more openings to hold the handle shaft assembly in the body.

2. A fluid coupling as recited in claim 1, wherein the retention member comprises two legs that extend in the one or more openings on opposing sides of the handle shaft assembly.

3. A fluid coupling as recited in claim 2, wherein the one or more openings open into the through-hole.

4. A fluid coupling as recited in claim 3, wherein the retention member interacts with the handle shaft assembly within the through-hole to selectively hold the handle shaft assembly in the body.

5. A fluid coupling as recited in claim 1, wherein the handle shaft assembly comprises a stuff box that is selectively positionable within a through-hole in the body.

6. A fluid coupling as recited in claim 5, wherein the retention member interacts with the stuff box to hold the handle shaft assembly in the body.

7. A fluid coupling as recited in claim 6, wherein the retention member is selectively positionable between an external opening of the through-hole and the stuff box.

8. The fluid coupling as recited in claim 6, wherein the stuff box comprises a shoulder that faces away from the fluid conduit and is engaged by the retention member.

9. A fluid coupling as recited in claim 1, wherein the body comprises a blind bore in which a portion of the handle shaft assembly is disposed.

10. A fluid coupling as recited in claim 9, wherein the one or more openings open into the blind bore, wherein the retention member interacts with the handle shaft assembly within the blind bore to selectively hold the handle shaft assembly in the body.

11. A fluid coupling as recited in claim 9, wherein the portion of the handle shaft assembly disposed in the blind bore comprises an annular groove that is engaged by the retention member to selectively hold the handle shaft assembly in the body.

12. A fluid coupling, comprising:
    a body having a fluid conduit extending therethrough, a through-hole extending through a sidewall thereof, and one or more openings that extend between an external surface of the body and an interior of the through hole;
    a poppet valve assembly disposed within the fluid conduit, the poppet valve assembly being selectively movable between an open position and a closed position;
    a handle shaft assembly comprising a handle shaft, an operational handle, and a stuff box, the handle shaft extending through the through-hole and into the fluid conduit, the stuff box being positionable within the through-hole, the handle shaft being interconnected with the poppet valve assembly such that the handle shaft assembly can be actuated to move the poppet valve assembly between the open position and the closed position; and
    a retention member that can be inserted through the one or more openings and into the through-hole to interact with the handle shaft assembly to selectively hold the handle shaft assembly in the body, the retention member being selectively removable from the one or more openings to disengage from the handle shaft assembly, the handle shaft assembly being removable from the body through the through-hole as a single unit when the retention member is removed from the one or more openings.

13. A fluid coupling as recited in claim 12, wherein the one or more openings are oriented generally parallel to the fluid conduit.

14. A fluid coupling as recited in claim 12, wherein the one or more openings are oriented generally perpendicular to the through-hole.

15. A fluid coupling as recited in claim 12, wherein the retention member comprises a U-pin having two spaced apart legs.

16. A fluid coupling as recited in claim 15, wherein the two spaced apart legs are positioned on opposing sides of the handle shaft when the retention member is inserted through the one or more openings.

17. A fluid coupling as recited in claim 12, wherein the handle shaft is interconnected with the poppet valve assembly by a linkage assembly.

18. A method for disassembling a fluid coupling, comprising:

providing a fluid coupling according to claim 12;

withdrawing the retention member from the one or more openings in the body;

removing the handle shaft assembly from the body as a single unit; and removing the poppet valve assembly from the body.

19. A method as recited in claim 18, wherein removing the handle shaft assembly from the body disconnects the handle shaft from the poppet valve assembly.

20. A method as recited in claim 18, further comprising disassembling the handle shaft assembly by disconnecting the operational handle from the handle shaft and removing the stuff box from the handle shaft.

* * * * *